June 19, 1923.

J. C. WISE

INNER TUBE

Filed Jan. 5, 1922

1,459,172

INVENTOR
JOSEPH C. WISE
BY
ATTORNEYS

Patented June 19, 1923.

1,459,172

UNITED STATES PATENT OFFICE.

JOSEPH C. WISE, OF LOS ANGELES, CALIFORNIA.

INNER TUBE.

Application filed January 5, 1922. Serial No. 527,088.

*To all whom it may concern:*

Be it known that I, JOSEPH C. WISE, a citizen of the United States, residing at Los Angeles, in the county of Los Angeles and State of California, have invented a new and useful Inner Tube, of which the following is a specification.

My invention relates to pneumatic tires and the principal object of my invention is to provide a puncture proof inner tube for such a tire, this tube being very long lived, and so designed that it can be readily manufactured by a process set forth hereinafter.

Further objects and advantages will be made evident hereinafter.

Referring to the drawing, which is for illustrative purposes only,

The construction, purposes and advantages of the tube will best be understood from a description of its method of manufacture.

The tube is formed by forming a hollow cylinder 11 on a mandrel, this cylinder being formed by wrapping several thicknesses of thin rubber around the mandrel, the various thicknesses being cemented together to form a hollow tube of thin rubber.

Figure 3:
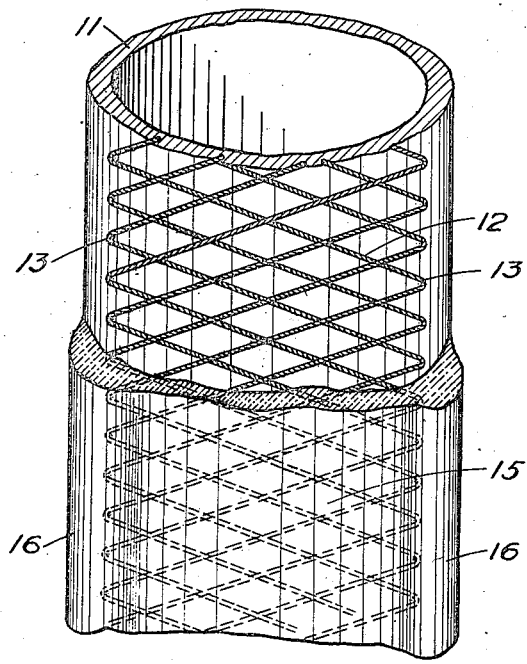
Fig. 3 is a perspective view of a portion of this tube before it has been turned inside out, a portion of the tread reinforcement being stripped off to show the internal construction.

After forming the tube 11, reinforcing cords 12 are secured to its outer surface. These reinforcing cords 12, as will be seen in Fig. 3, are diagonally disposed, crossing each other at regular intervals and terminating at points 13 well around on the side of the tread or the portion 14 which is hereinafter referred to as the tread portion of the tube.

Figure 2:
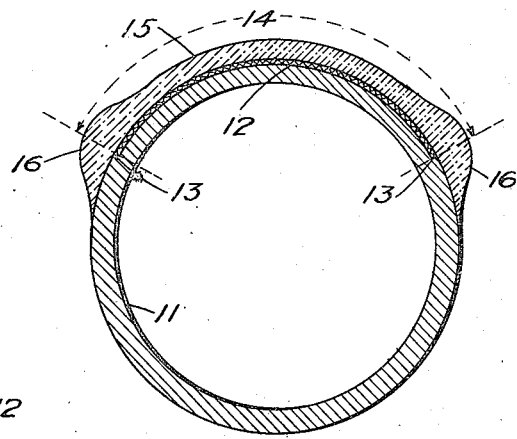
Fig. 2 is a view of the tube as originally made before being turned inside out and before having the ends joined.

After the cords 12 are put in place, a tread reinforcing member 15 is cemented along the tread portion 14 and the entire periphery of the tube, this reinforcing member being formed of high grade rubber having the shape shown in Fig. 2.

It will be noted that the member 15 has enlarged portions or shoulders 16 directly over the ends 13 of the cords 12. After the tire has been fabricated in the form shown in Fig. 2 and has been properly vulcanized, which may be accomplished by wrapping the completed tire while still on the mandrel with tape, or pressing it in a metal form, and subjecting it to heat; the tube is turned inside out and the ends are joined, forming a hollow ring having a section as appears in Fig. 1, which shows the tube inflated in a casing 20. The ring 11 is made quite elastic and not very thick.

Figure 1:
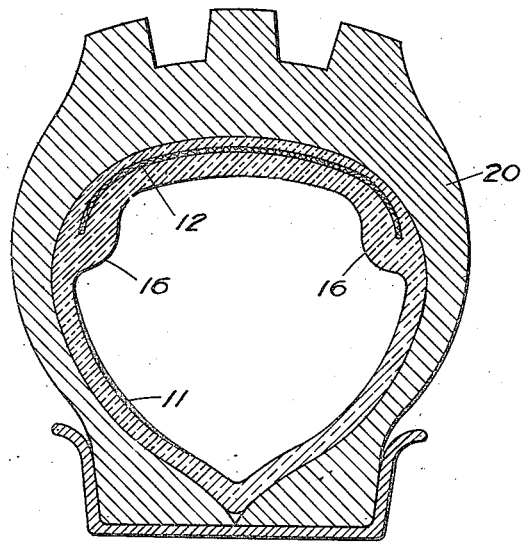
Fig. 1 is a cross section of an inner tube embodying my invention in place in a pneumatic tire casing.

Due to the presence of the cords 12, it is practically impossible to stretch the tread portion 14 of the tube 11 and when this tube has been turned inside out in the form shown in Fig. 1, the tread reinforcement 15 is placed under very considerable compression. This is due to the fact that the outer portion of this reinforcement cannot stretch due to the cords 12 and, as a result, the inner portion is compressed.

Any foreign body penetrating the inner tube must pass through this compressed material which naturally tends to close up about the foreign body or about the hole formed thereby as the foreign body is withdrawn, thereby preventing leakage of air.

I find that it is advisable to make the tube slightly over size so that when pressed inside the casing 20 a further compression is produced.

I claim as my invention:

1. An inner tube comprising: a hollow ring of elastic rubber; and a series of non-elastic members extending across the periphery thereof and terminating in thickened shoulders formed in the body of said ring.

2. An inner tube comprising: a hollow ring of elastic rubber; and a series of non-elastic cords diagonally disposed and extending across the periphery thereof and terminating in thickened shoulders formed in the body of said ring.

In testimony whereof, I have hereunto set my hand at Los Angeles, California, this 29th day of December, 1922.

JOSEPH C. WISE.